3,043,896
ELECTRIC DRY CELLS AND STORAGE BATTERIES

Danuta Herbert and Juliusz Ulam, Paris, France, assignors to Electric Techniques Corporation, N.V., Willemstad, Curacao, a corporation of Curacao
No Drawing. Filed Nov. 24, 1958, Ser. No. 775,733
Claims priority, application France Nov. 26, 1957
15 Claims. (Cl. 136—6)

This invention relates principally to new types of electric cells, both dry cells and storage batteries, as well as to a process for making such dry cells and storage batteries.

Dry cells built according to the invention are notably characterized by the fact that they comprise a reducing, or negative, electrode of lithium or an alloy of lithium with other metals such as sodium, zinc, silver, or magnesium, for example, or even an amalgam of lithium in contact with an electrolyte such as an alkaline or alkaline-earth perchlorate, iodide, sulfocyanide, bromide, or chlorate dissolved in a primary, secondary or tertiary saturated aliphatic amine preferably selected from among propylic, butylic and amylic amines, the oxidizing, or positive, electrode being composed preferably either of a halogen (except for fluorine), sulphur, selenium, oxides of these elements, their fluorides or compounds of them or else of metallic halogenides, sulphides, sulfocyanides, nitrates, chlorates and perchlorates or else of metallic oxides or derivatives of the latter.

Whereas, heretofore, it was impossible to utilize the great electro-positive properties of alkaline and alkaline-earth metals for the construction of dry cells and storage batteries because of the fact that conventional electrolytes directly attacked these metals, the present invention is principally characerized by the fact that it permits the use of a metal as electro-positive as lithium by dissolving the electrolyte in a saturated aliphatic amine. The dissolution of the electrolyte in an amine of the type described above avoids any local action and as a result insures the preservation of the lithium from any direct attack. The use, according to the invention, of a lithium reducing electrode of great electropositivity, in any case greater than that of the metals to which the art has heretofore been limited, which are less electropositive than lithium but not directly attacked by the electrolytes or at any rate attacked to a lesser extent than lithium, provides dry cells and storage batteries which are much more efficient than the dry cells and storage batteries used heretofore.

The applicants have, in effect, found that an electrolyte solvent composed of a saturated aliphatic amine, preferably selected from among the amines heretofore enumerated, no longer attacks lithium but insures instead the preservation of its integrity.

The absence of local energy actions makes it possible to construct particularly efficient dry cells and storage batteries.

The lithium reducing electrode may preferably be in the form of a spongy mass having an extended active surface area, sheets, blocks, etc. A lithium electrode of this type can be obtained by applying any of several processes, in particular and preferably, the process hereafter described: The lithium is melted in kerosene and is dispersed by intensive agitation of the liquid. The liquid is then cooled while the agitation is continued, and then the kerosene is eliminated by filtration and washing in absolute ether or by means of an amine. The resulting mass composed of spherical particles of lithium (of a diameter in the order of 0.05 to 1 mm.) is then compressed at a temperature somewhat below the melting point of lithium, at 180° C., for example, with a view to preserving a certain porosity in the product which then appears in the form of sheets or blocks.

The reducing electrode can just as well be in the form of alloys such as the alloys Li—Na, Li—Zn, Li—Ag, Li—Mg in which there are respectively the following proportions:

99–98% of Li for 1–2% of Na
95.5% of Li for 4.5% of Zn
99% of Li for 1% of Ag
95% of Li for 5% of Mg or in the form of an amalgam created by dipping the lithium in a solution of a mercury salt dissolved in an amine. This process makes it possible to obtain a reducing electrode such that only the surface of the lithium electrode is covered with a saturated amalgam.

The construction, according to the invention of dry cells comprising a lithium reducing electrode makes it possible to obtain:

(a) A large electric output compared with the weight of the electrode, approximately 3.7 A. hrs./g.

(b) An energy output which can exceed 200 w. hrs. per kilogram of dry cell weight for almost all the compounds of which the oxidizing electrode can be constituted.

(c) An electromotive force greater than 2 v. for almost all these compounds.

It is possible, moreover, to select the concentration of the electrolyte in the amine depending on the other elements in the dry cell or storage battery, and depending on the use to which the system built according to the present invention is intended. Solutions saturated with $Li^+$ ions maintain a constant cathode potential of $Li^+$, whereas dilute solutions produce a greater electromotive force.

Electrolytes suitable for use in conjunction with the aliphatic amines of the present invention include alkaline perchlorates, alkaline-earth perchlorates, alkaline iodides, alkaline-earth iodides, alkaline sulfocyanides, alkaline-earth sulfocyanides, alkaline bromides, alkaline-earth bromides, akaline chlorates, and alkaline-earth chlorates.

Depending on the degree of solubility in the amine of the compound of which the oxidizing electrode is composed, it might be necessary to provide a diaphragm for the latter or to use it in combination with graphite.

Among the compounds which might be used to constitute the oxidizing electrode:

(1) Metal fluorides produce a large energy output compared with the weight of the oxydant, and their amino-salts form without excessive increase in volume.

(2) Metallic iodides, sulfocyanides, nitrates, chlorates, and perchlorates produce, by exchange reaction with the lithium, salts of the latter soluble in amines, which prevents formation of crystalline deposits on the oxidizing electrode.

(3) The higher oxides of Cr, Mo, W as well as perchromates and molybdenates are stable in the presence of amines and provide a large energy output compared with the weight of the oxydant.

In the electrochemical system formed by the constituent elements of the dry cell embodying this invention, it is considered that if the oxidizing electrode used is a metallic halogenide, sulphide, sulfocyanide, nitrate, chlorate or perchlorate or else if it is composed of a metallic oxide, notably a higher oxide of Cr, Mo, or W, the electrolytic exchange reaction of the following type appears:

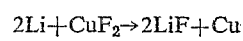

$$2Li + CuF_2 \rightarrow 2LiF + Cu$$

whereas if an oxidizing electrode of chlorine, bromine, iodine, sulphur, selenium, their oxides, their fluorides and compounds of them are introduced in the system, an equilibrium reaction of the following type is obtained:

$$2Li + S \rightleftharpoons Li_2S$$

for example, which represents a reversible dry cell and forms the basis of a storage battery.

The invention will be illustrated below by examples which do not constitute a limitation, but only a description intended to clarify the import of the invention:

Example 1

The reducing electrode being of lithium, $CuF_2$ is used as the oxidizing electrode, the electrolyte being composed of the following mixture:

$LiClO_4$, N (approximately 106 grams per 1000 grams of solution).

$NaClO_4$, 0.5 N (approximately 61 grams per 1000 grams of solution), the mixture being dissolved in isopropylamine.

The $CuF_2$ (obtained by dissolving CuO in HF after concentration) is dehydrated by heating in the absence of air in a copper receptacle and is then subjected to the action of the amine vapors. The salt thus produced and mixed with pulverized graphite (approximately 25% by weight) is compressed on a copper strip. It is separated from the lithium by one or two thicknesses of blotting paper. The latter completely surrounds the metal. The whole is introduced into an insulated and hermetically sealed receptacle.

The lithium must exceed the $CuF_2$.

The current must not exceed 10 ma./cm.$^2$ of lithium.

Example 2

Only the compound of which the oxidizing electrode is composed differs from the constituents of the dry cell described in Example 1. In this case, it is $CuCl_2$, the other elements remaining the same.

It is necessary in this case to separate the oxidizing electrode from the lithium reducing electrode by means of a diaphragm impermeable to the action of the anode.

Example 3

The reducing electrode being of lithium, iodine is used as the oxidizing electrode. The electrolyte is composed of a mixture of 1Li, 0.5 N (approximately 66 grams per 1000 grams of solution) and of $NaClO_4$, N (approximately 122 grams per 1000 grams of solution), the mixture being dissolved in isopropylamine.

The iodine, which appears in the form of crystals on a strip or sheet of stainless steel, is compressed. The oxidizing electrode thus formed is separated from the lithium reducing electrode by an electronegative diaphragm.

In this manner, reversible dry cells or storage batteries can be created.

It is self-evident that the foregoing description of this invention constitutes only one method of realizing this invention and that it is possible to envisage diverse variations of dry cells and storage batteries embodying the invention as well as processes for realizing it, while at the same time remaining within the spirit and scope of the invention.

What is claimed is:

1. An electric cell comprising a negative electrode selected from the group consisting of lithium, lithium alloys, and lithium amalgams, a positive electrode, and an electrolyte solution comprising an electrolyte solvent and an electrolyte, said solvent consisting essentially of at least one amine selected from the group consisting of primary saturated aliphatic amines, secondary saturated aliphatic amines, and tertiary saturated aliphatic amines wherein the hydrocarbon chains attached to the nitrogen atom of the amines of said group are selected from the group consisting of propyl, butyl, and amyl radicals.

2. The cell of claim 1 in which said negative electrode consists essentially of an alloy selected from the group consisting of lithium-sodium alloys, lithium-zinc alloys, lithium-silver alloys, and lithium-magnesium alloys.

3. The cell of claim 1 in which the said positive electrode s selected from the group consisting of chlorine, bromine, iodine, sulphur, selenium, oxides of sulphur, oxides of selenium, fluorides of sulphur, fluorides of selenium, metallic halogenides, metallic sulphides, metallic sulfocyanides, metallic nitrates, metallic chlorates, metallic perchlorates, metallic oxides, and derivatives of metallic oxides.

4. The cell of claim 1 in which the electrolyte consists essentially of at least one member selected from the group consisting of alkaline perchlorates, alkaline-earth perchlorates, alkaline iodides, alkaline-earth iodides, alkaline sulfocyanides, alkaline-earth sulfocyanides, alkaline bromides, alkaline-earth bromides, alkaline chlorates, and alkaline-earth chlorates.

5. The cell of claim 1 in which the said electrolyte solvent is saturated with said electrolyte.

6. An electric cell comprising a negative electrode selected from the group consisting of lithium, lithium alloys, and lithium amalgams, a positive electrode, and an electrolyte solution comprising an electrolyte solvent and an electrolyte, said solvent consisting essentially of a primary saturated aliphatic amine in which the hydrocarbon chain attached to the nitrogen atom is selected from the group consisting of propyl, butyl, and amyl radicals.

7. The cell of claim 6 in which the said negative electrode consists essentially of lithium.

8. The cell of claim 6 in which the said electrolyte solvent consists essentially of isopropyl amine.

9. An electric cell comprising a negative electrode consisting essentially of lithium, a positive electrode, and an electrolyte solution comprising an electrolyte solvent and an electrolyte, said solvent consisting essentially of a primary saturated aliphatic amine in which the hydrocarbon chain attached to the nitrogen atom is selected from the group consisting of propyl, butyl, and amyl radicals, said electrolyte solution being saturated with said electrolyte.

10. An electric cell comprising a negative electrode selected from the group consisting of lithium, lithium alloys, and lithium amalgams, a positive electrode, and an electrolyte solution comprising an electrolyte solvent and an electrolyte, said solvent consisting essentially of a secondary saturated aliphatic amine in which the two hydrocarbon chains attached to the nitrogen atom are selected from the group consisting of propyl, butyl, and amyl radicals.

11. The cell of claim 10 in which the said negative electrode consists essentially of lithium.

12. An electric cell comprising a negative electrode consisting essentially of lithium, a positive electrode, and an electrolyte solution comprising an electrolyte solvent and an electrolyte, said solvent consisting essentially of a secondary saturated aliphatic amine in which the two hydrocarbon chains attached to the nitrogen atom are selected from the group consisting of propyl, butyl, and amyl radicals, said electrolyte solution being saturated with said electrolyte.

13. An electric cell comprising a negative electrode selected from the group consisting of lithium, lithium alloys, and lithium amalgams, a positive electrode, and an electrolyte solution comprising an electrolyte solvent and an electrolyte, said solvent consisting essentially of a tertiary saturated aliphatic amine in which the three hydrocarbon chains attached to the nitrogen atom of said amine are selected from the group consisting of propyl, butyl, and amyl radicals.

14. The cell of claim 13 in which the said negative electrode consists essentially of lithium.

15. An electric cell comprising a negative electrode consisting essentially of lithium, a positive electrode, and an electrolyte solution comprising an electrolyte solvent and an electrolyte, said solvent consisting essentially of a tertiary saturated aliphatic amine in which the three hydrocarbon chains attached to the nitrogen atom of said amine are selected from the group consisting of propyl, butyl, and amyl radicals, said electrolyte solution being saturated with said electrolyte.

References Cited in the file of this patent

UNITED STATES PATENTS

| | | |
|---|---|---|
| 499,848 | Norton | June 20, 1893 |
| 553,719 | Olan | Jan. 28, 1896 |
| 1,829,635 | Davey | Oct. 27, 1931 |
| 2,634,303 | Moulton | Apr. 7, 1953 |
| 2,806,786 | Kelley | Sept. 27, 1957 |
| 2,863,933 | Minnick et al. | Dec. 9, 1958 |

OTHER REFERENCES

Walden: Electrochemie Nichtwassriger, Losungen, 1924, pages 469 and 483.

Mann: Organic Inhibitors of Corrosion Transaction of Electrochemical Soc., vol. LXIX, 1936, pages 115–129.